(12) United States Patent
Jolimaitre et al.

(10) Patent No.: US 7,435,699 B2
(45) Date of Patent: Oct. 14, 2008

(54) HETEROGENEOUS ADSORBENT AND THE USE FOR DIFFUSIONAL SEPARATION METHODS

(75) Inventors: Elsa Jolimaitre, Lyons (FR); Loïc Rouleau, Charly (FR); Olivier Ducreux, Bougival (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 377 days.

(21) Appl. No.: 10/522,782

(22) PCT Filed: Jul. 11, 2003

(86) PCT No.: PCT/FR03/02220

§ 371 (c)(1),
(2), (4) Date: Jan. 31, 2005

(87) PCT Pub. No.: WO2004/012835

PCT Pub. Date: Feb. 12, 2004

(65) Prior Publication Data

US 2005/0250641 A1    Nov. 10, 2005

(30) Foreign Application Priority Data

Aug. 1, 2002    (FR) .................................. 02 09841

(51) Int. Cl.
*B01J 29/06*    (2006.01)
*B01J 20/18*    (2006.01)
*C07C 7/13*    (2006.01)
*B01D 59/26*    (2006.01)
*B01D 15/00*    (2006.01)

(52) U.S. Cl. .............................. 502/64; 502/67; 502/69; 502/71; 502/77; 502/79; 502/400; 502/407; 502/414; 585/820

(58) Field of Classification Search ................. 502/400, 502/407, 414, 69, 71, 77, 79, 67, 64; 585/820; 95/141, 143; 210/660, 661
See application file for complete search history.

(56) References Cited

U.S. PATENT DOCUMENTS

| 3,827,989 | A |   | 8/1974 | Scott |
| 4,283,583 | A | * | 8/1981 | Velenyi et al. ............. 585/467 |
| 4,420,419 | A |   | 12/1983 | Ogawa |
| 6,013,851 | A | * | 1/2000 | Verrelst et al. ............. 585/533 |
| 6,284,021 | B1 |   | 9/2001 | Lu et al. |
| 2002/0045793 | A1 |   | 4/2002 | Jolimaitre et al. |

FOREIGN PATENT DOCUMENTS

| EP | 1080771 | 3/2001 |
| EP | 1182246 | 2/2002 |
| FR | 2206123 | 6/1974 |
| FR | 2794993 | 12/2000 |
| JP | 59016832 | 1/1984 |
| JP | 01151939 | 6/1989 |
| JP | 04367722 | 12/1992 |
| JP | 09057095 | 3/1997 |
| WO | WO 9532049 | 11/1995 |

OTHER PUBLICATIONS

Patent Abstracts of Japan vol. 1997. No. 07, Jul. 31, 1997.
Database WPI Section Ch, Week 199305 Derwent Publications Ltd., London, GB; AN 1993-041446 XP002236838.
Database WPI Section Ch, Week 198930 Derwent Publications Ltd., London, GB: AN 1989-215642 XP002236839.
Patent Abstracts for Japan vol. 008, No. 102 (C-222), May 12, 1984.

* cited by examiner

*Primary Examiner*—Elizabeth D Wood
(74) *Attorney, Agent, or Firm*—Millen, White, Zelano & Branigan, P.C.

(57) ABSTRACT

A non-homogeneous adsorbent is described, formed of a core and at least one continuous outer layer in which the core of said adsorbent has a volume adsorptive capacity representing at least 35% of the volume of the adsorbent and the outer layer has a diffusional selectivity greater than 5. The adsorbent is used in gas-separation processes or liquid-separation processes.

16 Claims, No Drawings

HETEROGENEOUS ADSORBENT AND THE USE FOR DIFFUSIONAL SEPARATION METHODS

TECHNICAL FIELD

The present invention relates to a non-homogeneous adsorbent constituted by at least one crystal formed from a core and at least one continuous outer layer, used in diffusional separation processes. Diffusional separation processes exploit the property of two molecules to be separated by diffusion kinetics difference inside solids of different chemical composition.

STATE OF THE PRIOR ART

An optimal adsorbent for carrying out separation processes on an industrial scale, such as the separation of atmospheric oxygen and nitrogen, the separation of argon from nitrogen and oxygen, the separation of monobranched and dibranched paraffins must have, on the one hand, a considerable diffusion kinetics difference between the molecules to be separated and, on the other hand, a good adsorptive capacity.

Homogeneous adsorbents, i.e. those constituted by the same chemical composition throughout their volume, are known in the state of the art; these homogeneous adsorbents generally either have good performances in terms of separation, but only a low adsorptive capacity, such is the case in particular with silicalite of MFI structural type, or have good adsorption capacities but do not make it possible to carry out the desired separation.

Non-homogeneous adsorbents constituted by a core and an outer layer are also known in the state of the art (FR-A1-2 794 993, EP-A1-1 080 771). The central part of such non-homogeneous adsorbents is only weakly, if at all, adsorbent and is covered, at least partly, by an adsorbent peripheral layer, generally a zeolite. The formulation of such adsorbents does not make it possible to improve the performances of the separation process in terms of adsorptive capacity but solely to reduce the diffusional resistance of the species adsorbed into the adsorbent particle so as to have adsorbent particles with high kinetics. In this case it is a question of a thermodynamic separation where the selectivity of the peripheral layer is thermodynamic. The present invention proposes to supply a novel non-homogeneous adsorbent having an adsorptive capacity which is appreciably improved relative to homogeneous adsorbents and non-homogeneous adsorbents the central part of which does not act as an adsorbent.

SUMMARY OF THE INVENTION

The non-homogeneous adsorbent according to the invention is constituted by at least one crystal formed from a core and at least one continuous outer layer and is characterized in that the core of said adsorbent has a volume adsorptive capacity representing at least 35% of the volume of the adsorbent and the outer layer has a diffusional selectivity greater than 5. Said non-homogeneous adsorbent is constituted by crystals combined into grains, each crystal having a core and at least one continuous outer layer having the characteristics defined above. Preferably, the core has a crystal size between 0.1 µm and 0.4 mm and the continuous outer layer has a thickness between 0.01 and 100 µm.

USEFULNESS OF THE INVENTION

The fact that the non-homogeneous adsorbent according to the invention is constituted by an adsorbent core and a continuous and selective outer layer within the crystal makes it possible to obtain an adsorbent which has a high adsorptive capacity while still ensuring good selectivity. Therefore, as the adsorptive capacity of the non-homogeneous adsorbent is high, the cost of the separation processes in which the non-homogeneous adsorbent is used is significantly reduced since the mass of adsorbent necessary for a given separation is inversely proportional to the adsorptive capacity. The invention therefore makes it possible to reduce the quantity of adsorbent to be used in order to carry out a separation.

DISCLOSURE OF THE INVENTION

The adsorbent according to the present invention is a non-homogeneous adsorbent constituted by at least one crystal formed from a core or central nucleus and at least one outer layer having a chemical composition or crystalline structure different from that of the core. As said adsorbent is quite particularly suitable for the diffusional separation of fluids, it is essential that at least one outer layer of the adsorbent is continuous on the surface of the core of the adsorbent in order that said core is not in direct contact with the fluid phase to be separated. The core of the adsorbent according to the invention makes it possible to guarantee a good adsorptive capacity of this adsorbent whilst at least one continuous outer layer on the surface of the core of the adsorbent makes it possible to ensure a good diffusional selectivity. Therefore the present invention relates to a non-homogeneous adsorbent formed from a core and at least one continuous outer layer characterized in that the core of said adsorbent has a volume adsorptive capacity representing at least 35% of the volume of the adsorbent and the outer layer has a diffusional selectivity greater than 5. The adsorptive capacity, expressed within the framework of the present invention in % by volume, can be taken as being the volume of adsorbent accessible to the molecule that can be adsorbed per volume unit of the adsorbent at the considered temperature. By continuous outer layer must be understood a homogeneous covering of uniform thickness over the surface of the core of the adsorbent. Said continuous outer layer covers the whole of the core and is characterized by a considerable diffusional selectivity vis-à-vis the desired separation. Therefore, it is possible to speak of a continuous and selective outer layer. Consequently, it has a considerable diffusional resistance, such as to allow the passage of only some of the molecules present in the mixture to be separated, i.e. the least encumbered molecules which diffuse the most rapidly. Said continuous outer layer, having a diffusional selectivity greater than 5, has an adsorptive capacity smaller than that of the core of the adsorbent according to the invention. The core, totally covered by said continuous outer layer with strong diffusional selectivity, has a diffusional selectivity much smaller than that of said layer. Neither the core nor the continuous outer layer of the adsorbent according to the invention are catalytically active. They contain no catalytically active metal so as to avoid any reaction and/or conversion of the molecules upon contact with the adsorbent.

More precisely, the adsorbent according to the present invention is constituted by grains, each grain being constituted by crystals. According to the invention, each crystal is formed from a core having a volume adsorptive capacity representing at least 35% of the volume of the adsorbent and a continuous outer layer with a diffusional selectivity greater than 5. According to the invention, the composition of the core of a crystal is different from that of the continuous outer layer of this same crystal. The non-homogeneity of the adsorbent according to the invention is therefore located in the crystal (micrometre scale), each crystal having a non-homogeneous composition throughout their volume.

The adsorbent according to the invention can have several outer layers so as to form a multi-layer adsorbent. According to the invention, at least one of these layers totally encases the core so as to form a continuous outer layer on the surface of the core and such that it has a diffusional selectivity greater than 5. The adsorbent according to the invention advantageously comprises a single continuous layer.

The volume adsorptive capacity of the core of the adsorbent preferably represents at least 40% of the volume of the adsorbent and even more preferably represents at least 45% of the volume of the adsorbent. The diffusional selectivity of the continuous outer layer, covering the whole of the core of the adsorbent, is preferably greater than 10, preferably greater than 50, more preferably greater than 100 and even more preferably greater than 175.

According to an embodiment of the invention, the core of the adsorbent is partially or totally empty. In the case where the core is entirely empty, the volume adsorptive capacity of the core represents 100% of the volume of the adsorbent. This implementation is particularly suitable for the separation of liquid mixtures.

According to another embodiment of the invention, the core of the adsorbent having a volume adsorptive capacity representing at least 35% of the volume of the adsorbent is formed from an adsorbent material constituted by a crystallized microporous solid having a pore diameter between 0.1 and 20 nm or a crystallized mesoporous solid having a pore diameter of 20 to 500 nm. From among the crystallized microporous solids, it is possible to choose for example ceramics, clays, pillar clays, activated carbons, silicas, aluminas, silica-aluminas, zeolites such as the zeolites belonging to the FAU structural type (X zeolite, Y zeolite), the BEA structural type (beta zeolite). Among crystallized mesoporous solids, MCM-41 and MCM-48 solids are particularly preferred. Generally, any porous heterostructure, crystallized or amorphous, having a pore size between 0.1 nm and 500 nm and having a volume adsorptive capacity representing at least 35% of the volume of the adsorbent, preferably at least 40% of the volume of the adsorbent, and very preferably at least 45% of the volume of the adsorbent is suitable for forming the core of the adsorbent. The size of the crystals constituting the core of the adsorbent according to the invention is advantageously between 0.1 μm and 0.4 mm, more advantageously between 0.2 and 50 μm, even more advantageously between 0.5 and 5 μm. The core of the adsorbent has a negligible diffusional resistance.

Independently of the chemical nature of the core, i.e. independently of the presence of a partially or entirely empty core, or a core formed from a crystallized solid, the continuous outer layer having a diffusional selectivity greater than 5 is constituted by a crystallized microporous solid having a pore diameter between 0.1 and 20 nm, preferably between 0.1 and 10 nm, and even more preferably between 0.1 and 5 nm. These are for example activated carbons, silicas, aluminas, aluminophosphates, zeolites exchanged or not exchanged with different cations, zeolites surface-treated or with a surface deposit (organometallic type), metallosilicates such as aluminosilicates, borosilicates and titanosilicates and metallophosphates such as aluminophosphates, gallophosphates and zincophosphates. The thickness of the continuous outer layer having a diffusional selectivity greater than 5 and entirely surrounding the core of the adsorbent can be variable depending on the adsorbents and also for a specific adsorbent as a function of the molecules to be separated and the experimental conditions, in particular temperature, pressure, rate of circulation of the fluid. Preferably, the thickness of said outer layer is between 0.01 and 100 μm even more preferably between 0.1 and 10 μm. It is particularly advantageous if the core measures between 0.2 and 50 μm, and at least one continuous outer layer is between 0.01 and 100 μm thick, giving a maximum size of the crystals of the non-homogeneous adsorbent according to the invention of 150 μm. Advantageously, the core of the adsorbent represents at least 10% and at most 99% of the total volume of the non-homogeneous adsorbent according to the invention, it preferably represents between 20 and 90% thereof, and even more preferably it represents between 40 and 85% of the total volume of said adsorbent. In the case where the adsorbent is spherical or cylindrical in form, the radius of the core represents at least 40% of the total radius of the adsorbent, more advantageously it represents at least 60% thereof and even more advantageously it represents at least 70% of the total radius of the adsorbent. Preferably, the adsorbent according to the invention is spherical in form.

Advantageously and according to the invention, the solid which constitutes the core of the adsorbent has a greater pore size than that of the solid which constitutes the continuous outer layer.

For the implementation of the adsorbent according to the invention, it is preferable to use zeolitic solids for the core and the continuous outer layer. Said zeolitic solids differ in their structural type and/or in the chemical composition of their crystalline framework and/or in the nature of the compensating cations. Preferably, the zeolites used as a constituent of the core of the adsorbent are zeolites of FAU structural type, in particular Y zeolite and X zeolite, zeolites of BEA structural type, in particular beta zeolite, zeolites of EUO structural type, in particular the EU-1 zeolite, and zeolites of TON structural type, in particular the ZSM-22 zeolite. The zeolites used as a constituent of the continuous outer layer are preferably zeolites having the MFI structural type, in particular the silicalite zeolite. Combinations of zeolitic solids to form the core/continuous outer layer assembly are very advantageously Y zeolite/silicalite, X zeolite/silicalite, beta zeolite/silicalite, Y zeolite/EU-1 zeolite, X zeolite/EU-1 zeolite, Y zeolite/ZSM-22 zeolite and X zeolite/ZSM-22 zeolite combinations.

The shape of each of the crystals contained in the adsorbent according to the invention is not a determining parameter for the utilization of said adsorbent; they can in particular be in the shape of a sphere, cylinder or ellipsoid.

The preparation of the non-homogeneous adsorbent according to the invention consists of forming one or more layers of solids, at least one of which is continuous and selective, on a solid with a high adsorptive capacity constituting the core of the adsorbent according to the invention or on an organic support material, easily decomposable by a thermal or chemical treatment, and thus leaving a very large pore volume in the case of this decomposition. Said organic support material can for example be polystyrene. At least one of said layers totally encases the core of the adsorbent so as to form a continuous and selective outer layer having a diffusional selectivity greater than 5. This continuous and selective outer layer is constituted by a crystallized microporous solid, for example a zeolite of MFI structural type. The core of the adsorbent can be constituted by one of the materials mentioned above.

The non-homogeneous adsorbent according to the invention can, for example, be prepared by a process comprising:
a) the sticking of nanocrystals of selective zeolites to solids crystals constituting the core, optionally with chemical (grafting agents) or electrostatic (surface charge reversal agents) binders. This sticking can be achieved in one or more operations, for example in stirred and aqueous medium, for example after prior treatment of the solid constituting the core with a chemical or electrostatic binder, b) the growth of selective zeolites, optionally with the deposition or prior formation of nanocrystals playing the role of nuclei allowing seeding, facilitating growth and stuck for example by the above method. This growth can be carried out in one or more operations, for example in stirred and aqueous medium under hydrothermal conditions with the sources of the elements necessary for the crystallization of the zeolites, for example after the deposition of nanocrystals of the sought zeolite.

The zeolite nanocrystals can be synthesized by the method known as "clear solution" as described in the article by V. Valtchev et al. (*J. Mater. Chem*, 2002, 12, 1914-1918). The electrostatic binders can be cationic polymers such as those described by V. Valtchev et al., in particular Rediflock 4150® (AKZO Nobel) and Berocell 6100® (AKZO Nobel) (Zeolites and Mesoporous Materials at the Dawn of the 21st Century, Proceedings of the 13th International Zeolite Conference, Montpellier, France, 8-13 Jul. 2001, *Studies in Surface Science and Catalysis*, vol 135, p. 298).

The solid constituting the core can optionally undergo various treatments before the deposition of the layer. For mesoporous zeolites and materials, standard thermal and chemical modification treatments known to a person skilled in the art can be envisaged, in particular, calcination operations in order to evacuate for example the organic structuring agent and ion-exchange operations in order to bring the zeolites into the sought cationic form. Surface treatments can optionally be carried out in order to extract elements harmful to the formation of this layer, in order to promote the reactivity of the core or the anchoring of the crystals of this layer. These treatments can also comprise the adsorption of specific charge-reversal or grafting agents in order to ensure the adhesion of the crystals of the layer.

After formation of the layer, thermal and chemical modification operations can be carried out, in order to decompose for example the structuring agents, or the organic binders, or the organic support material if one is used, and in order to bring the zeolites into their sought cationic form.

The non-homogeneous adsorbent can be shaped by techniques known to a person skilled in the art, in particular granulation or extrusion, with a binder. The shaping is advantageously followed by drying and calcination. These shaped solids can undergo thermal and chemical treatments, such as those described above, before use in adsorption processes.

The solid constituting the core of the adsorbent is chosen so as to confer the required dimensions upon the adsorbent according to the invention. The thickness of the continuous and selective outer layer is ensured by controlling the adhesion conditions, in particular the number of stages.

The adsorbent according to the invention can be used in all separation processes using diffusional selectivity as the motive force of the separation and employing techniques of separation by adsorption well known to a person skilled in the art being carried out by pressure effect (PSA or Pressure Swing Adsorption), by temperature effect (TSA or Temperature Swing Adsorption), by a combination of the two effects of temperature and pressure (PTSA or Pressure and Temperature Swing Adsorption), by vacuum effect (VSA or Vacuum Swing Adsorption) or in SCC (simulated counter-current), reactive SCC.

The adsorbent according to the invention is advantageously used in gas- or vapour-separation processes. It is also successfully used in liquid-separation processes. It is preferably used for the separation of paraffinic isomers according to the degree of branching (normal, mono-, di-, tri-branched species) and very preferably for the separation of mono-branched paraffins from dibranched paraffins.

EXAMPLES

Example 1

Preparation of a Non-Homogeneous Adsorbent According to the Invention

A non-homogeneous adsorbent is prepared in which the core is constituted by X zeolite (faujasite structural type) and the outer layer is constituted by a silicalite-1 (MFI structural type).

The silicalite-1 layer is formed on X zeolite crystals by growth after sticking of silicalite-1 nanocrystals.

Synthesis of the X Zeolite:

The X zeolite is synthesized according to the method described by R. W. Thompson et al. (*Zeolites*, 1993, vol 13, 645-653). The gel is prepared from a solution of sodium silicate, sodium aluminate and triethanolamine according to the formulation

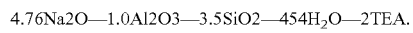
4.76Na2O—1.0Al2O3—3.5SiO2—454H$_2$O—2TEA.

The sodium aluminate solution is prepared by dissolving soda (Aldrich) then aluminium wires (Aldrich) in permutated water. The triethanolamine (Aldrich) is added to this solution in order to stabilize it. The sodium silicate solution is obtained by dilution of nonhydrated sodium metasilicate (Fischer) in permutated water. The two solutions are mixed vigorously in order to form the gel.

The gel is introduced into a 125-ml autoclave under autogenous pressure, at 115° C. over 24 hours in order to ensure crystallization. The solid is recovered by filtration, washed thoroughly on the filter with permutated water and oven-dried at 60° C. for 12 hours under air. The solid is in the form of X zeolite crystals (of FAU type) with a purity of 95% according to X-ray diffraction analysis. The average size of the crystals is approximately 6 μm.

Synthesis of Silicalite-1 Nanocrystals:

The silicalite-1 nanocrystals were synthesized by the so-called "clear solution" method described in the article by V. Valtchev et al. (*J Mater. Chem*, 2002, 12, 1914-1918).

The gel is prepared from a solution of tetraethylorthosilicate, tetrapropylammonium hydroxide according to the formulation:

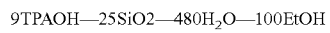
9TPAOH—25SiO2—480H$_2$O—100EtOH

The tetraethylorthosilicate (Merck) is diluted in the permutated water. This solution is mixed vigorously with that of tetrapropylammonium hydroxide (Merck, 20% by weight) and left, accompanied by stirring, for 14 hours at ambient temperature, in order to promote hydrolysis of the silicon source, producing ethanol (EtOH).

The gel obtained is introduced into a 125-ml autoclave at 60° C. for 3 weeks in order to ensure crystallization. The solid is recovered by ultracentrifugation then washed by multiple dispersions in an ammonium hydroxide solution (0.1 M NH3, pH=9.5) and dispersed in this solution at 2% by weight of zeolite. The solid is in the form of silicalite-1 zeolite crystals (of MFI type) of 99% purity according to X-ray diffraction analysis and of the order of 100 nm in size, according to transmission electron microscopy.

Adsorption and Growth of the Silicalite-1 Crystals on the X Zeolite Crystals:

The silicalite-1 nanocrystals are stuck to the X zeolite by charge reversal of the X zeolite with a cationic polymer according to the method described in the article by V. Valtchev (Zeolites and Mesoporous Materials Conference, Montpellier, France, 8-13 Jul. 2001, Studies in Surface Science and Catalysis, vol. 135, 298).

The charge-reversal polymer (Rediflock 4150, Akzo) is adsorbed onto the zeolite in aqueous solution. The dispersion of silicalite-1 nanocrystals is mixed with that of X zeolite adsorbed with the cationic polymer.

The growth of the silicalite-1 crystals is carried out by three hydrothermal operations at 95° C. for 24 hours in a 125-ml autoclave with the gel leading to the silicalite-1 nanocrystals. After each hydrothermal operation, the suspended solid is recovered by filtration and washed thoroughly on the filter with permutated water. The solid resulting from the three hydrothermal growth operations is oven-dried at 60° C. for 12 hours and subjected to a calcination treatment in order to extract the organic structuring agent present in the pores of the silicalite-1 layer and necessary for its formation. The calcination treatment is carried out so as to limit the deterioration of the layer, under a gaseous nitrogen-oxygen mixture, with 5% by volume O2, at 500° C. for 2 h.

The product thus obtained has the two silicalite-1 and X zeolite phases according to X-ray diffraction and is composed of a continuous and selective outer layer of silicalite-1 nanocrystals with a thickness of 1 μm, on X zeolite crystals, with a diameter of 6 μm.

Example 2

Separation of Mono/Dibranched Paraffins. Application to the Separation of 3-methylpentane (3-MP) and 2,2 dimethylbutane (22DMB)

The performances values of a homogeneous adsorbent, tested in order to carry out the separation of 3-methylpentane (3-MP) and 2,2 dimethylbutane (22DMB), are compared with those obtained with the non-homogeneous adsorbent prepared according to Example 1, tested for the separation of the same molecules. The homogeneous adsorbent is entirely constituted by silicalite zeolite and is in the form of a sphere with a radius R=1 μm.

The chief adsorption and diffusion properties of the molecules which it is wished to separate, i.e. 3-methylpentane (3-MP) and 2,2 dimethylbutane (22DMB), in the two adsorbents studied are recorded in Table 1.

TABLE 1 adsorption and diffusion properties of 3MP and 22DMB in the X zeolite and in the silicalite

| | X zeolite | Silicalite zeolite |
|---|---|---|
| Adsorptive capacity at 200° C. (% by volume) | 45.0 | 18.1 |
| Diffusion coefficients of 3MP at 200° C. (m²/s) | $8 * 10^{-10}$ | $5 * 10^{-14}$ |
| Diffusion coefficients of 22DMB at 200° C. (m²/s) | $2 * 10^{-10}$ | $2 * 10^{-16}$ |
| Diffusional selectivity | 4 | 250 |

Table 1 shows clearly that the X zeolite possesses a very good adsorptive capacity for the molecules that it is wished to separate, but little diffusional selectivity. Conversely, the silicalite has a very good diffusional selectivity for the two paraffins, but an adsorptive capacity more than 3 times less than that of the X zeolite. Finally, the diffusion coefficients of the 3 MP and 22DMB are much higher in the X zeolite than in the silicalite.

The adsorptive capacity of the non-homogeneous adsorbent is calculated by the formula $$qs = qs_{silicalite} + \left[\frac{R_{cx}}{R_{csilicalite}}\right]^3 \cdot (qs_x - qs_{silicalite})$$

where $qs_x$ and $qs_{silicalite}$ are respectively the adsorptive capacities of the X zeolite and the silicalite at 200° C. and $R_{cx}$ and $R_{csilicalite}$ are respectively the radii of the X zeolite and the silicalite.

In this example, the radius of the core of the adsorbent represents 75% of the total radius of non-homogeneous adsorbent, which gives a volume adsorptive capacity representing 29.4% of the volume of the adsorbent, i.e. an increase of 62.7% in the adsorptive capacity compared with that of the silicalite. The adsorptive capacity of the non-homogeneous adsorbent is therefore 1.627 times greater than that of the homogeneous adsorbent.

Calculation of the Diffusion Properties:

Table 2 shows the characteristic diffusion times of 3 MP and 22 DMB in the homogeneous adsorbent constituted by silicalite (not according to the invention) and in the non-homogeneous adsorbent constituted by a core of X zeolite and an outer layer of silicalite (according to the invention). These characteristic times are defined in the case of a sphere by the formula $$\frac{R_c^2}{D}$$

where $R_c$ is the radius of the sphere and D the diffusion coefficient, and representing the average time necessary for the molecule to travel the characteristic distance of the solid studied.

TABLE 2 characteristic diffusion times of 3MP and 2,2-DMB in the two adsorbents studied.

| | | Characteristic diffusion time in X zeolite (s) | Characteristic diffusion time in silicalite (s) | Total time (s) |
|---|---|---|---|---|
| Homogeneous adsorbent (entirely constituted by silicalite) | 3MP | — | 20 | 20 |
| | 22DMB | — | 5000 | 5000 |
| Non-homogeneous adsorbent (X zeolite core; silicalite outer layer) | 3MP | 0.012 | 20 | 20.012 |
| | 22DMB | 0.045 | 5000 | 5000.045 |

It appears that the characteristic diffusion times of 3 MP and 22DMB are the same in the two adsorbents. As the diffusion of these molecules in the X zeolite is very rapid, the diffusional resistance induced by the presence of this solid in the non-homogeneous adsorbent is negligible. The two adsorbents are therefore identical in terms of diffusional selectivity of separation. Consequently, the non-homogeneous adsorbent according to the invention makes it possible to maintain the properties of diffusional selectivity whilst doubling the adsorption capacities of the homogeneous adsorbent. The introduction of a core constituted by an adsorbent material into the structure of an adsorbent so as to form a non-homogeneous adsorbent therefore leads to an appreciable improvement in the adsorptive capacity, the non-homogeneous adsorbent preserving very satisfactory diffusional selectivity properties.

The invention claimed is:

1. A crystalline non-homogeneous adsorbent comprising a zeolitic crystalline core having a size between 0.2 and 50 μm combined with at least one crystalline zeolitic continuous outer layer having a thickness between 0.1 μm and 100 μm wherein the core of said adsorbent has a volume adsorptive capacity representing at least 35% of the volume of the adsorbent and the outer layer has a diffusional selectivity greater than 5, said core having a diffusional selectivity lower than that of the outerlayer, and wherein said core and said outer layer are compositionally different.

2. A crystalline non-homogeneous adsorbent according to claim 1, wherein the volume adsorptive capacity of the core represents at least 40% of the volume of the adsorbent.

3. A crystalline non-homogeneous adsorbent according to claim 1, wherein the diffusional selectivity of the outer layer is greater than 10.

4. A crystalline non-homogeneous adsorbent according to claim 1, wherein the adsorptive capacity of the core is greater than that of the continuous outer layer.

5. A crystalline non-homogeneous adsorbent according to claim 1, wherein the continuous outer layer has a thickness between 0.1 and 10 μm.

6. A crystalline non-homogeneous adsorbent according to claim 1 in spherical or cylindrical form.

7. A crystalline non-homogeneous adsorbent according to claim 6, wherein the radius of the core represents at least 40% of the total radius of the adsorbent.

8. A gas- or vapour- separation process comprising passing a multicomponent gas through a zone comprising the crystalline non-homogeneous adsorbent according to claim 1.

9. A liquid-separation process comprising passing a multicomponent gas through a zone comprising the crystalline non-homogeneous adsorbent according to claim 1.

10. A crystalline non-homogeneous adsorbent according to claim 1, wherein the core comprises a faujasite structural type zeolite and the outer layer comprises an MFI structural type zeolite.

11. A crystalline non-homogeneous adsorbent according to claim 10, wherein the faujasite structural type zeolite comprises zeolite X and the MFI structural type zeolite comprises silicalite-1.

12. A gas separation process comprising passing a multi component gas through a zone comprising the crystalline non-homogeneous adsorbent according to claim 10.

13. A process according to claim 12, wherein said gas comprises mono-branched paraffins and di-branched paraffins.

14. A crystalline non-homogeneous adsorbent according to claim 1, produced by first preparing a solid zeolite core and next preparing a dispersion of a second zeolite for the outer layer and adhering particles of said outer layer zeolite to said core zeolite.

15. A process for producing the crystalline non-homogeneous zeolitic adsorbents according to claim 1, comprising preparing a solid core of a first zeolite and a dispersion of nano particles of a second zeolite, and contacting said dispersion with said solid core so as to adhere particles of said second zeolite onto said first zeolite.

16. A crystalline non-homogeneous adsorbent according to claim 1, wherein the core of the adsorbent has a negligible diffusional resistance.

* * * * *